United States Patent
Oh et al.

(10) Patent No.: US 12,039,016 B2
(45) Date of Patent: Jul. 16, 2024

(54) METHOD AND APPARATUS FOR GENERATING TRAINING DATA TO TRAIN STUDENT MODEL USING TEACHER MODEL

(71) Applicant: Samsung Electronics Co., Ltd., Suwon-si (KR)

(72) Inventors: Dokwan Oh, Hwaseong-si (KR); Yoonsuk Hyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1563 days.

(21) Appl. No.: 15/933,609

(22) Filed: Mar. 23, 2018

(65) Prior Publication Data

US 2019/0034764 A1 Jan. 31, 2019

(30) Foreign Application Priority Data

Jul. 31, 2017 (KR) .................. 10-2017-0096902

(51) Int. Cl.
 *G06F 21/31* (2013.01)
 *G06F 18/21* (2023.01)
 (Continued)

(52) U.S. Cl.
 CPC .......... *G06F 21/31* (2013.01); *G06F 18/2148* (2023.01); *G06F 18/2178* (2023.01);
 (Continued)

(58) Field of Classification Search
 CPC .. G06K 9/6257; G06K 9/6263; G06K 9/6277; G06F 21/31; G06N 3/0454;
 (Continued)

(56) References Cited

U.S. PATENT DOCUMENTS 5,761,384 A 6/1998 Inoue et al.
8,538,566 B1 * 9/2013 Bennett ................ G06F 16/683
 706/20

(Continued)

FOREIGN PATENT DOCUMENTS

KR 10-2007-0055530 A 5/2007
KR 10-1027864 B1 4/2011
(Continued)

OTHER PUBLICATIONS

Hinton, Geoffrey, et al., "Distilling the Knowledge in a Neural Network." *arXiv preprint arXiv:1503.02531*, 2015, (pp. 1-9).
(Continued)

*Primary Examiner* — Beemnet W Dada
(74) *Attorney, Agent, or Firm* — NSIP Law (57) ABSTRACT

Disclosed is a training data generating apparatus and method to change output data inappropriate for training a student model to an ignore value such that the inappropriate output data is not used to train the student model, change output data appropriate for training the student model such that the student model outputs an improved result in comparison to output data of a teacher model, and change a label value in a form of probability to an identifier corresponding to intervals divided based on threshold label values using the teacher model based on input data.

18 Claims, 7 Drawing Sheets

(51) Int. Cl.
  *G06F 18/214*    (2023.01)
  *G06F 18/2415*   (2023.01)
  *G06N 3/045*     (2023.01)
  *G06N 3/08*      (2023.01)
  *G06N 7/01*      (2023.01)
  *G06V 10/764*    (2022.01)
  *G06V 10/778*    (2022.01)
  *G06V 20/00*     (2022.01)

(52) U.S. Cl.
  CPC ......... *G06F 18/2415* (2023.01); *G06N 3/045* (2023.01); *G06N 3/08* (2013.01); *G06N 7/01* (2023.01); *G06V 10/764* (2022.01); *G06V 10/7784* (2022.01); *G06V 20/00* (2022.01)

(58) Field of Classification Search
  CPC ........... G06N 3/08; G06N 7/005; G06N 3/04; G06V 20/00; G06V 10/7784; G06V 10/764
  See application file for complete search history.

(56) References Cited

U.S. PATENT DOCUMENTS

| | | | |
|---|---|---|---|
| 8,958,631 B2* | 2/2015 | Kutliroff | G06V 10/44 |
| | | | 382/159 |
| 10,289,962 B2* | 5/2019 | Vinyals | G06N 7/00 |
| 10,679,143 B2* | 6/2020 | Dong | G06N 20/10 |
| 11,170,262 B2* | 11/2021 | Kuroda | G06F 18/2155 |
| 2016/0078339 A1* | 3/2016 | Li | G06N 3/084 |
| | | | 706/20 |
| 2017/0024641 A1 | 1/2017 | Wierzynski | |
| 2017/0083829 A1* | 3/2017 | Kang | G06N 3/0454 |

FOREIGN PATENT DOCUMENTS

| | | | | |
|---|---|---|---|---|
| KR | 10-2016-0030996 A | 3/2016 | | |
| WO | WO 2017/073373 A1 | 5/2017 | | |
| WO | WO-2017073373 A1 * | 5/2017 | ............. | G06F 16/48 |

OTHER PUBLICATIONS

Korean Office Action issued on Aug. 30, 2022, in counterpart Korean Patent Application No. 10-2017-0096902 (6 Pages in Korean, 3 Pages in English).

* cited by examiner

METHOD AND APPARATUS FOR GENERATING TRAINING DATA TO TRAIN STUDENT MODEL USING TEACHER MODEL

CROSS-REFERENCE TO RELATED APPLICATIONS

This application claims the benefit under 35 USC § 119 (a) of Korean Patent Application No. 10-2017-0096902 filed on Jul. 31, 2017 in the Korean Intellectual Property Office, the entire disclosure of which is incorporated herein by reference for all purposes.

BACKGROUND

1. Field

The following description relates to method and apparatus for generating training data for training a neural network.

2. Description of Related Art

A neural network is a model comprising an interconnected group of nodes, which is obtained by expressing selected characteristics of human biological neurons, and generating mapping between input data and output data. A supervised machine learning method is a method of training a neural network based on input data and truth data corresponding to the input data. When the neural network is trained based on the truth data, output data output by the neural network in response to input data converges to truth data corresponding to the input data.

To train a neural network, a large quantity of input data and training data are generated. Generally, a person manually extracts information from input data, to generate training data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating training data, the method including inputting input data to a teacher model and acquiring a label value of the input data, classifying the label value into one of a plurality of intervals based on comparing the label value to threshold probabilities, and generating training data for training a student model corresponding to the teacher model based on combining the input data and an identifier of the corresponding interval of the plurality of intervals.

The classifying may include classifying the label value into a positive interval among the intervals, in response to the label value being greater than or equal to a greatest threshold probability among the threshold probabilities, and the positive interval indicating that the input data corresponds to a class associated with the label value.

The classifying may include classifying the label value into a negative interval among the intervals, in response to the label value being less than a smallest threshold probability among the threshold probabilities, and the negative interval indicating that the input data does not correspond to a class associated with the label value.

The classifying may include classifying the label value into an ignore interval in which the label value is not applied to a training of the student model, in response to the label value being greater than or equal to a smallest threshold probability among the threshold probabilities and less than or equal to a greatest threshold probability among the threshold probabilities.

A number of hidden layers in the student model may be less than a number of hidden layers in the teacher model, or a number of filters in the student model may be less than a number of filters in the teacher model.

The plurality of intervals may include one or more rational numbers indicating whether the input data corresponds to a class associated with the label value.

The data recognition method may include generating additional training data and repeating the training of the student model, in response to an accuracy of the student model being lesser than a threshold.

In another general aspect, there is provided a data recognition method including receiving target data to be recognized, and recognizing the target data using a student model that is trained, wherein the student model is trained based on training data generated based on classifying a label value into one of a plurality of intervals based on threshold probabilities, and the label value is acquired by inputting input data to a teacher model corresponding to the student model.

The plurality of intervals may include a positive interval indicating that the input data corresponds to a class associated with the label value, a negative interval indicating that the input data does not correspond to the class associated with the label value, and an ignore interval in which the label value is not applied to a training of the student model.

The teacher model may include a number of hidden layers less than a number of hidden layers in the student model or a number of filters less than a number of filters included in the student model.

In another general aspect, there is provided an apparatus for generating training data, the apparatus including a memory configured to store input data, and a processor configured to input the input data to at least one teacher model and to acquire probabilities that the input data matches each of a plurality of classes, compare the probabilities to threshold probabilities and to change the probabilities to values corresponding to the comparison, and combine the input data and the changed probabilities to generate training data for training a student model corresponding to the at least one teacher model.

The processor may be configured to change a probability, among the probabilities, to a positive value indicating that the input data matches a class corresponding to the probability, in response to the probability being greater than or equal to a greatest threshold probability among the threshold probabilities.

The processor may be configured to change a probability, among the probabilities, to a negative value indicating that the input data does not match a class corresponding to the probability, in response to the probability being less than or equal to a smallest threshold probability among the threshold probabilities.

The processor may be configured to change a probability, among the probabilities, to an ignore value indicating that the probability is not applied to a training of the student model, in response to the probability being greater than or equal to a smallest threshold probability among the threshold probabilities and being less than or equal to a greatest threshold probability among the threshold probabilities.

The at least one teacher model may include a plurality of teacher models and the processor is further configured to acquire the probabilities based on the plurality of teacher models.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise.

The examples described herein may be implemented in various forms, such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, a smart appliance, an intelligent vehicle, a home appliance, a biometrics-based door lock, a security device, a financial service device, a kiosk, communication systems, image processing systems, graphics processing systems, various Internet of Things (IoT) devices that are controlled through a network, a smart vehicle, other consumer electronics/ information technology(CE/IT) device, or any other device capable of wireless communication or network communication consistent with that disclosed herein. The examples may be applied to verify a user in, for example, a smartphone, a mobile device, and a smart home system. Example embodiments may be applied to a payment service based on a user authentication. Further, the examples may also be applied to an intelligent vehicle system that starts an ignition through a user authentication. The examples may also be applied to image processing for user authentication in an intelligent vehicle, an apparatus for automatic driving, a smart home environment, a smart building environment, a smart office environment, office automation, and a smart electronic secretary system.

Figure 1:
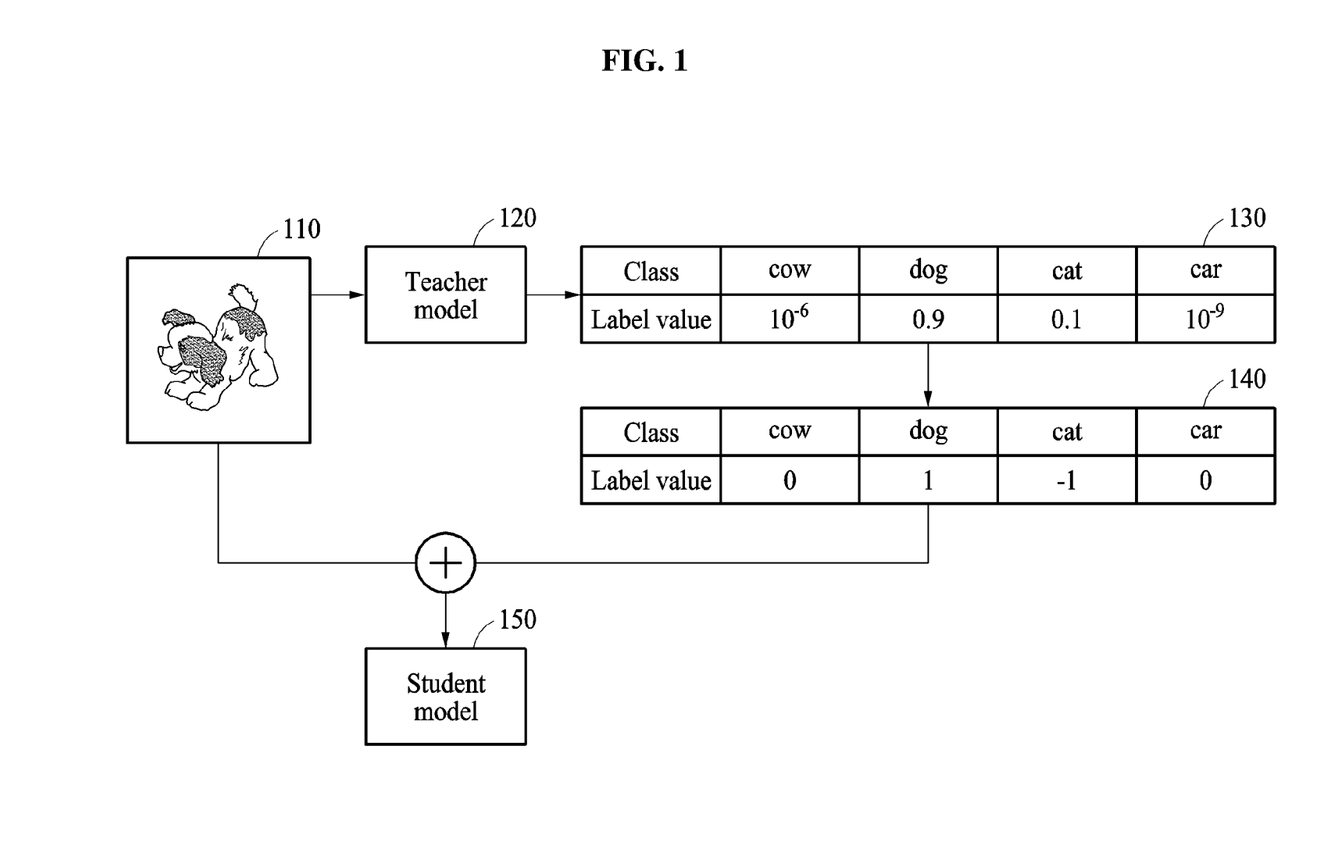
FIG. 1 illustrates an example of an operation of a training data generating apparatus training a student model using a teacher model trained in advance.

FIG. 1 illustrates an example of an operation of a training data generating apparatus training a student model 150 using a teacher model 120 trained in advance.

In an example, each of the teacher model 120 and the student model 150 are a model trained to generate output data with respect to input data and include, for example, a neural network. The neural network is a recognition model that simulates a computation capability of a biological system using a large number of artificial neurons connected through connection lines, for example, edges. The neural network uses artificial neurons configured by simplifying functions of biological neurons. The artificial neurons are connected to each other through edges having connection weights. The connection weights are values of the edges, and may also be referred to as synapse weights or connection strengths. The neural network performs a human cognition or learning process through the artificial neurons. In an example, the artificial neurons are referred to as nodes.

In an example, the neural network includes a plurality of layers. For example, the neural network includes an input layer, at least one hidden layer, and an output layer. The input layer receives input data to for training and transmits the input data to the hidden layer. The output layer generates output data of the neural network based on signals received from nodes of the hidden layer. At least one hidden layer is disposed between the input layer and the output layer. The hidden layer changes the input data received from the input layer to an easily predictable value. Nodes of the input layer and the at least one hidden layer are connected to each other through edges having connection weights. Nodes in the hidden layer and the output layer are also connected to each other through edges having connection weights. The input layer, the at least one hidden layer, and the output layer each include a plurality of nodes. The hidden layer may be a fully connected layer or a convolution filter in a convolutional neural network (CNN), or various types of filters or layers grouped based on a particular function or characteristic.

A neural network including a plurality of hidden layers may be referred to as a deep neural network. Training the deep neural network may be referred to as deep learning. Among nodes of the neural network, a node included in the hidden layer may be referred to as a hidden node.

The neural network learns through a supervised learning. The supervised learning is, for example, a method of inputting input data to a neural network, acquiring output data corresponding to the input data, and updating a connection weight of connection lines to allow the output data to match truth data to be acquired from the input data, thereby converging the output data of the neural network to the truth data. The training data generating apparatus employs, for example, a delta rule and the error back propagation learning to train the student model 150. The training data generating apparatus trains the student model 150 by updating a connection weight between nodes included in the student model 150. Hereinafter, training or learning of a neural network is understood as training a parameter of the neural network. Also, a trained neural network is understood as a neural network to which a trained parameter is applied.

The training data generating apparatus generates input data to be input to an input layer of the student model 150 and training data matching truth data to be acquired based on the input data using the student model 150 in order to train the student model 150. The training data generating apparatus acquires the truth data from the teacher model 120.

Referring to FIG. 1, the teacher model 120 and the student model 150 of the training data generating apparatus identify an object in input data provided in a form of image. The teacher model 120 and the student model 150 classify the object in the input data 110 as a preset class, for example, a cow, a cat, a dog, and a car. The training data generating apparatus inputs the input data 110 to the teacher model 120 such that the teacher model 120 acquires label values 130 generated based on the input data 110.

In the example of FIG. 1, the label values 130 are probabilities of the object matching classes. The training data generating apparatus determines a probability, for example, $s_i$ of the object matching an $i^{th}$ class based on a value of a node in an output layer of the teacher model 120 using Equation 1.

$$s_i = \frac{\exp(z_i)}{\sum_j \exp(z_j)} \qquad \text{[Equation 1]}$$

In Equation 1, the training data generating apparatus acquires the label values 130, for example, soft labels, having a form of softmax output from the teacher model 120. In the example of FIG. 1, an object included in the input data 110 in a form of image is identified using the teacher model 120. In this example, a desirable result to be obtained from the input data 110 is that a probability of the object being a dog is relatively high and probabilities of the object being a cow, a cat, and a car are significantly low. Referencing the label values 130 output by the teacher model 120, the probability of the object being the dog is 0.9, which is significantly high, and is the desirable result. Also, the probabilities of the object being the cow and the car are respectively $10^{-6}$ and $10^{-9}$, which are significantly small, and are the desirable result. The probability of the object being the cat is 0.1, which is greater than the probabilities of the object being the cow and the car, and thus, is not desirable for training the student model 150.

When the student model 150 is trained based on training data generated by matching the label values 130 and the input data 110, although only the dog is included in the input data 110, the student model 150 is trained using the label values 130 including inaccurate information, for example, a probability of the object in the input data 110 being the cat, 0.1. This is similar to a situation in which an image of the dog is delivered to be learned as if the cat is present in the image at a probability of 10%.

To more accurately train the student model 150, the training data generating apparatus changes the label values 130 output by the teacher model 120. In an example, the training data generating apparatus changes a value inappropriate for training the student model 150 among the label values 130 to a preset value such that the inappropriate value is not used for training the student model 150. In the example of FIG. 1, the training data generating apparatus changes, among the label values 130, the probability of the object being the cat corresponding to a undesirable value for training the student model 150 to a value, for example, an integer of −1, indicating that the value is not to be used for training the student model 150.

The training data generating apparatus refines the label values 130 based on characteristics of the input data 110 such that the label values 130 are more appropriately used for training the student model 150. Since the object included in the input data 110 is the dog, the student model 150 may output a probability higher than 0.9, the probability of the object being the dog acquired from the teacher model 120. Thus, the training data generating apparatus changes a probability corresponding to a label value having a relatively high probability among the label values 130, to a value indicating that the input data 110 matches a class corresponding to the label value having the relatively high probability. In the example of FIG. 1, the training data generating apparatus changes the probability of the object being the dog among the label values 130, to a value, for example, an integer of 1, indicating that the input data 110 matches a class corresponding to the dog.

Since the object included in the input data 110 is not the cow or the car, the student model 150 may output a probability lower than the probability of the object being the cow or the car acquired from the teacher model 120. Thus, the training data generating apparatus changes a probability corresponding to a label value having a relatively low probability among the label values 130, to a value indicating that the input data 110 does not match a class corresponding to the label value having the relatively low probability. In the example of FIG. 1, the training data generating apparatus changes the probabilities of the object being the cow and the cat among the label values 130, to values, for example, an integer of 0, indicating that the input data 110 does not match classes corresponding to the cow and the cat.

In an example, the training data generating apparatus refines the label values 130, and maps probabilities in forms of rational numbers in the label values 130 to one of a limited number of values in a set of preset values, for example, −1, 0, and 1, indicating how to train the student model 150 based on the corresponding probability. In FIG. 1, result label values 140 are the label values 130 changed by the training data generating apparatus. The training data generating apparatus generates training data for training the student model 150 by combining the result label values 140 and the input data 110. The generated training data is used for training the student model 150.

Figure 2:
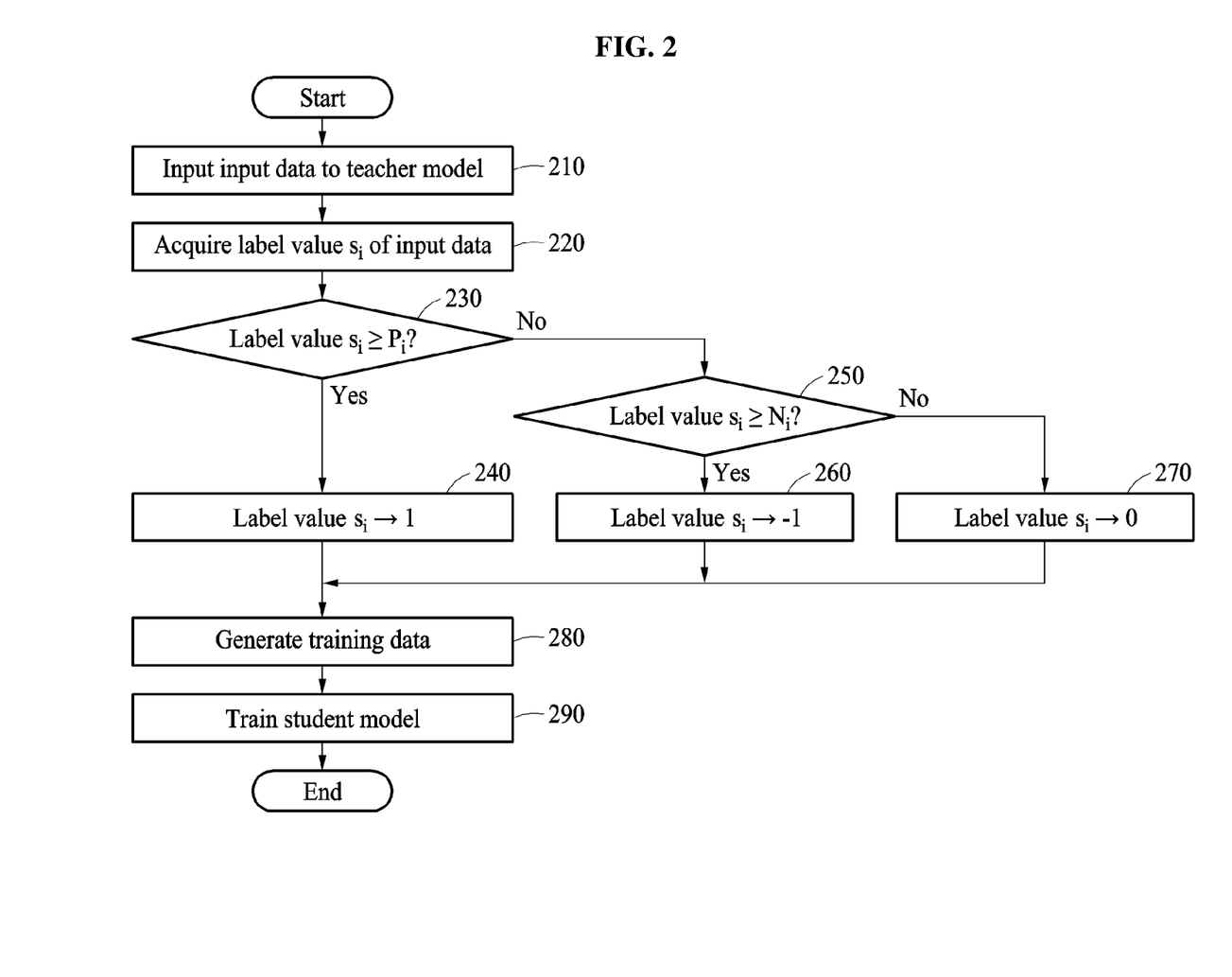
FIG. 2 illustrates an example of an operation of a training data generating apparatus generating training data by refining label values.

FIG. 2 is a diagram illustrating an example of an operation of refining label values and generating training data using a training data generating apparatus. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, the training data generating apparatus inputs input data to a teacher model. In an example, the training data generating apparatus preprocess the input data based on an input layer of the teacher model. In an example, the training data generating apparatus identifies a value of a node in an output layer of the teacher model output based on the input data.

In operation 220, the training data generating apparatus acquires a label value of the input data from the identified value of the node in the output layer. The label value is a result obtained by analyzing the input data using the student model. Also, the label value includes information to be acquired from the input data using the student model.

When the teacher model determines whether the input data corresponds to at least one of a plurality of preset classes, the teacher model outputs whether the input data corresponds to a class as a probability value using, for example, Equation 1. The training data generating apparatus acquires label values including probability values of the input data corresponding to the classes. In FIG. 2, a label value $s_i$ is a probability that input data acquired from the teacher model by the training data generating apparatus corresponds to an $i^{th}$ class.

As discussed above, in an example, the training data generating apparatus changes the label values output by the teacher model to more accurately train the student model. The training data generating apparatus compares each of the label values to at least one threshold associated with forms of the label values, and changes each of the label values based on the comparison. For example, the label values are classified into one of a plurality of intervals based on the at least one threshold, and the training data generating apparatus changes each of the label values to a value corresponding to an interval into which the corresponding label value is classified.

In the example of FIG. 2, the training data generating apparatus compares label values, each represented in a form of probability between 0 and 1, to at least one of two threshold probabilities corresponding to values between 0 and 1. In an example, $P_i$ and $N_i$ denote threshold probabilities compared to a label value $s_i$ corresponding to the $i^{th}$ class by the training data generating apparatus, $P_i$ being greater than $N_i$. In an example, the threshold probabilities $P_i$ and $N_i$ are determined heuristically.

The training data generating apparatus compares the label value $s_i$ to at least one of threshold probabilities $P_i$ and $N_i$. Referring to FIG. 2, in operation 230, the training data generating apparatus compares the label value $s_i$ to the threshold probability $P_i$ which is greater than the threshold probability $N_i$. Since the teacher model outputs label values for each class, in an example, the training data generating apparatus performs an operation of comparing a label value to a corresponding threshold probability on all label values.

When the label value $s_i$ is greater than the threshold probability $P_i$ corresponding to a greater value between the threshold probabilities $P_i$ and $N_i$, in operation 240, the training data generating apparatus changes the label value $s_i$ to an identifier, for example, an integer of 1, of an interval greater than the threshold probability Pi. The label value $s_i$ being greater than the threshold probability $P_i$ indicates that the input data matches a class corresponding to the label value $s_i$. Thus, the training data generating apparatus determines the label value $s_i$ to be a label value appropriate for training the student model. The training data generating apparatus changes the label value $s_i$ to a value indicating that the input data matches the class corresponding to the label value $s_i$, for example, the identifier corresponding to the interval greater than the threshold probability Pi.

When the label value $s_i$ is less than the threshold probability $P_i$ corresponding to a greater value between the threshold probabilities $P_i$ and $N_i$, in operation 250, the training data generating apparatus compares the label value $s_i$ to the threshold probability $N_i$, which corresponds to a smaller value between the threshold probabilities $P_i$ and $N_i$. The training data generating apparatus compares a label value to a plurality of threshold probabilities in sequence, and identify an interval including the label value among a plurality of intervals divided based on the plurality of threshold probabilities.

When the label value $s_i$ is greater than the threshold probability $N_i$ corresponding to a smaller value between the threshold probabilities $P_i$ and $N_i$, in operation 260, the training data generating apparatus changes the label value $s_i$ to an identifier, for example, an integer of −1, of an interval greater than the threshold probability $N_i$ and less than the threshold probability Pi. When the label value $s_i$ is greater than the threshold probability $N_i$ and less than the threshold probability Pi, it is ambiguous that the input data matches a class corresponding to the label value $s_i$. Because the label value $s_i$ is greater than the threshold probability $N_i$, it is also ambiguous that the input data does not match the label value $s_i$. Thus, the training data generating apparatus determines the label value $s_i$ to be a label value inappropriate for training the student model. The training data generating apparatus changes the label value $s_i$ to a value indicating that the label value $s_i$ is not to be used for training the student model, for example, the identifier corresponding to the interval greater than the threshold probability $N_i$ and less than the threshold probability Pi.

When the label value $s_i$ is less than the threshold probability $N_i$ corresponding to a smaller value between the threshold probabilities $P_i$ and $N_i$, in operation 270, the training data generating apparatus changes the label value $s_i$ to an identifier, for example, an integer of 0, of an interval less than the threshold probability Ni. The label value $s_i$ being less than the threshold probability $N_i$ indicates that the input data does not match a class corresponding to the label value $s_i$. Thus, the training data generating apparatus determines the label value $s_i$ to be a label value appropriate for training the student model. The training data generating apparatus changes the label value $s_i$ to a value indicating that the input data does not match the class corresponding to the label value $s_i$, for example, the identifier corresponding to the interval less than the threshold probability $N_i$.

The training data generating apparatus changes the label value $s_i$ to one of identifiers corresponding to a plurality of intervals into which label values are classified using Equation 2.

$$\text{if } h_i = \begin{cases} 1, & s_i \geq P_i \\ -1, & P_i > s_i \geq N_i \\ 0, & s_i < N_i \end{cases} \quad \text{[Equation 2]}$$

As shown in Equation 2, the training data generating apparatus changes the label value $s_i$ and outputs a label value $h_i$ changed with respect to the $i^{th}$ class.

In operation 280, the training data generating apparatus generates training data including the changed label value $h_i$ and the input data. In an example, the training data includes the label value $h_i$ expressed as one of a limited number of values included in a set $\{1, 0, -1\}$ other than infinite rational numbers greater than 0 and less than 1, as the truth data of the input data. The training data includes a hard level obtained by refining a soft label in a soft max output form generated by the teacher model. The hard level is included in the training data as the truth data.

In operation 290, the training data generating apparatus trains the student model based on the generated training data. The training data generating apparatus may not use a label value indicating that the label value is not to be used for training the student model, for example, the integer of −1, among the label values to train the student model. In an example, the student model is trained using the class matching the input data and the class non-matching the input data.

The training data generating apparatus disclosed herein generates a large amount of training data at a faster rate using the teacher model, in comparison directly extracting information from input data and generating training data. Thus, the student model is trained at a faster speed in comparison to the case in which a person directly extracts information from input data and generates training data. Since the training data generating apparatus does not use a value inappropriate for training the student model, unnecessary confusion is reduced in training the student model.

Figure 3:
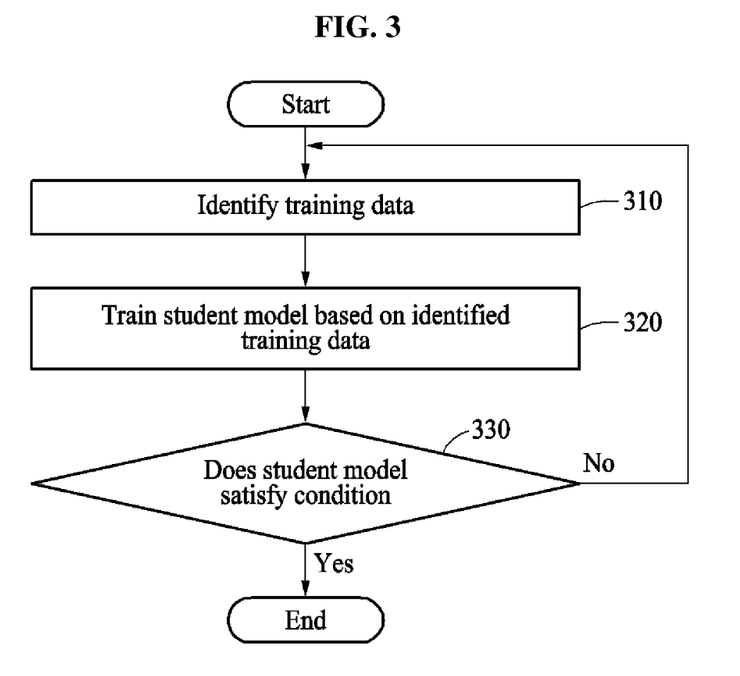
FIG. 3 illustrates an example of training a student model based on training data generated by a training data generating apparatus.

FIG. 3 is a diagram illustrating an operation of training a student mode using training data generated by a training data generating apparatus. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, a training data generating apparatus identifies training data to be used for training a student model. In an example, the training data is acquired based on the operations of FIG. 2. The training data includes input data to be input to an input layer of the student model and truth data indicating how to determine output data of the student model corresponding to the input data.

In operation 320, the training data generating apparatus trains the student model based on the identified training data. As shown in Equation 2, the truth data expresses whether the input data matches a class using a value indicating that the input data matches the class, a value indicating that the input data does not match the class, and a value indicating that it is ambiguous whether or not the input data matches the class and the value is not to be used for training.

In an example, the training data generating apparatus trains the student model using the class matching the input data and the class not matching the input data, but not the class for which whether the input data matches the class is ambiguous. Through this, the student model is more accurately trained in comparison to a case in which the student model directly learns a label value in a form of probability. Also, since the student does not directly learn a probability of the teacher model, a more accurate result may be achieved when compared to the teacher model.

In operation 330, the training data generating apparatus determines whether the student model satisfies a condition. The training data generating apparatus determines whether the training of the student model is to be terminated. For example, the training data generating apparatus determines whether an accuracy of the student model is greater than or equal to a threshold. When the accuracy of the student model is less than the threshold, the training data generating apparatus repeats the training of the student model. In this example, the training data generating apparatus generates additional training data using the teacher model. Because the training data generating apparatus generates additional training data using the teacher model instead of a person directly extracting information from input data and generating training data, it is possible to acquire a large amount of training data at a lower cost. When the accuracy of the student model is greater than or equal to the threshold, the training data generating apparatus terminates the training of the student model.

In an example, the training data generating apparatus determines whether a number of training times of the student model satisfies a threshold number of training times. When the number of training times of the student model is less than the threshold number of training times, the training data generating apparatus repeats operations 310 and 320. Similarly, the training data generating apparatus additionally generates training data to be input to the student model using the teacher model. When the number of training times of the student model is greater than or equal to the threshold number of training times, the training data generating apparatus terminates the training of the student model.

In an example, the student model on which the training is completed is used to train another student model as a teacher model. In an example, the student model on which the training is completed is used to recognize target data in the same form as input data input to the teacher model.

Figure 4:
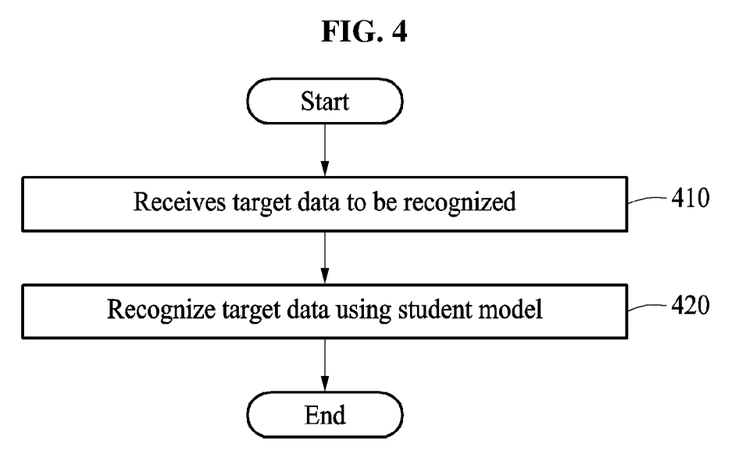
FIG. 4 illustrates an example of an operation performed by a data recognition apparatus using a student model trained by a training data generating apparatus.

FIG. 4 is a diagram illustrating an operation performed by a data recognition apparatus using a student model trained by a training data generating apparatus. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, a data recognition apparatus receives target data to be recognized. The target data is data to be recognized using a student model trained through the aforementioned operations of FIGS. 2 and 3. The target data includes any one or any combination of data, such as, for example, image data, video data, voice data, time-series data, and sensor data.

A neural network is used for various purposes in various fields in addition to the example of identifying an object in image-type input data using a teacher model and a student model as described with reference to FIG. 1. In one example, the teacher model recognizes a human face included in input data in a form of image. In this example, the student model is trained based on training data generated by refining a result of recognition performed on the human face corresponding to the input data by the teacher model. In another example, the teacher model converts voice data into text data. In this example, the student model learns training data generated by refining text data output by the teacher data based on the voice data. In other examples, the neural network may also be applied to, for example, emotion recognition and situation recognition.

In operation 420, the data recognition apparatus recognizes the target data using the student model. The student model outputs information acquired from the target data. The output information may be similar to information acquired from the input data by the teacher model. For example, when the teacher model expresses a type of an object in image-type input data using a probability that the type of the object in the image-type input data matches each of a plurality of preset classes, the student model expresses a type of an object in image-type target data using a probability that the type of the object in the image-type target data matches each of a plurality of preset classes.

Figure 5:
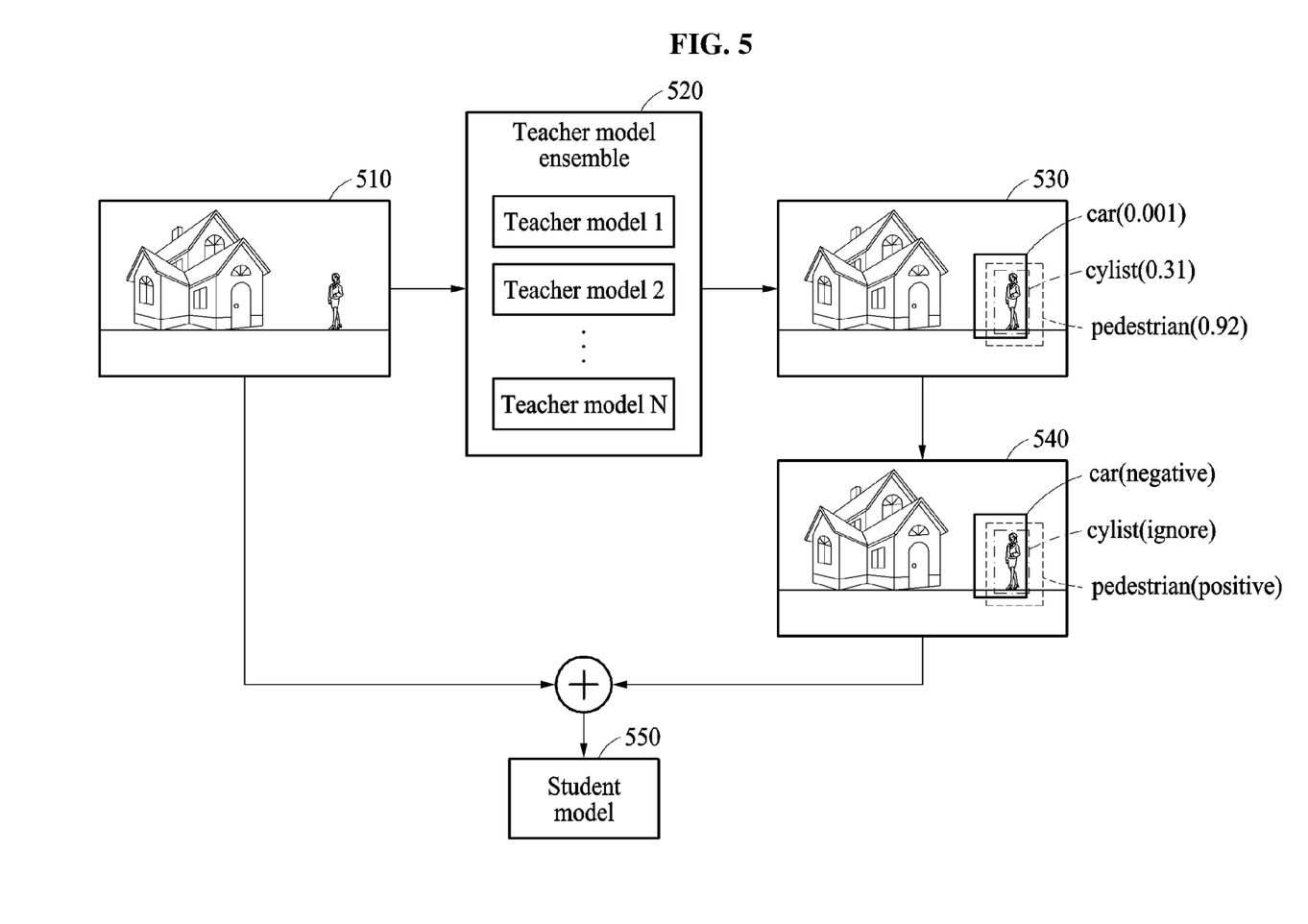
FIG. 5 illustrates an example of an operation of a training data generating apparatus training a student model using a teacher model ensemble trained in advance.

FIG. 5 is a diagram illustrating an operation of a training data generating apparatus training a student model 550 using a teacher model ensemble 520 trained in advance. The teacher model ensemble 520 includes N teacher models, N being a natural number greater than or equal to 1. The N teacher models may have different initial weights, different neural network structures, or different hyper parameters.

Referring to FIG. 5, the training data generating apparatus inputs input data 510 provided in a form of image to the teacher model ensemble 520. Also, the training data generating apparatus acquires label values including probabilities that a position of an object and a type of the object in the input data 510 match a preset class from the teacher model ensemble 520. The training data generating apparatus visually outputs the acquired label values to input data 530. While extracting the object in the input data 530, the teacher model ensemble 520 outputs a probability that the object is a pedestrian, for example, 0.92, a probability that the object is a cyclist, for example, 0.31, and a probability that the object is a car, for example, 0.001.

The probability that the object is the pedestrian, 0.92 indicates that the object is the pedestrian. Also, the probability that the object is the car, 0.001 indicates that the object is not the car. The training data generating apparatus determines a label value associated with the pedestrian and a label value associated with the car to be a label value appropriate for training the student model 550 among the label values acquired from the teacher model ensemble 520.

The training data generating apparatus identifies a label value inappropriate for training the student model 550 among the label values acquired from the teacher model ensemble 520. Since the probability that the object is the cyclist, 0.31 is higher than the probability that the object is the car, 0.001, it may be understood that the object is the cyclist. Since the probability that the object is the cyclist, 0.31 is lower than the probability that the object is the pedestrian, 0.92, it may also be understood that the object is not the cyclist. As such, the probability that the object is the cyclist, 0.31 ambiguously indicates whether the object is the cyclist. Thus, the training data generating apparatus determines a label value associated with the cyclist to be a label value inappropriate for training the student model 550 among the label values acquired from the teacher model ensemble 520.

The training data generating apparatus compares each of the label values acquired from the teacher model ensemble 520 to at least one corresponding threshold label value, and determines whether each of the label values is appropriate for training the student model 550. For example, at least two threshold label values may be set. When two threshold label values are set, the training data generating apparatus determines that a label value greater than a greatest threshold label value indicates that the input data 510 matches a class corresponding to the label value. Also, the training data generating apparatus determines that a label value less than a smallest threshold label value indicates that the input data 510 does not match a class corresponding to the label value. Further, a label value greater than the smallest threshold label value and less than the greatest threshold label value ambiguously indicates whether the input data 510 matches a class corresponding to the label value. In this example, the training data generating apparatus determines that the label value is inappropriate for training the student model 550.

The training data generating apparatus changes the label values based on a result obtained by comparing each of the label values acquired from the teacher model ensemble 520 to the at least one corresponding threshold label value. The training data generating apparatus classifies the label values into one of a plurality of intervals divided based on a threshold label value, and changes the label values to identifiers of the divided intervals. When the label values are probabilities between 0 and 1, a label value determined from a limited number of rational numbers between 0 and 1 is changed to one of n+1 identifiers corresponding to n+1 intervals divided based on n threshold label values.

In the example of FIG. 5, it is assumed that the training data generating apparatus sets threshold label values to 0.8 and 0.3. The training data generating apparatus determines a label value greater than or equal to 0.8 to be a label value that indicates that the input data 510 matches a class corresponding to the label value. Also, the training data generating apparatus determines a label value less than or equal to 0.3 to be a label value that indicates that the input data 510 does not match a class corresponding to the label value. In FIG. 5, the probability that the object of the input data 510 is the pedestrian is 0.92, which is greater than 0.8. Thus, the training data generating apparatus changes the probability that the object is the pedestrian to a positive value indicating that the object matches the pedestrian. Also, the probability that the object of the input data 510 is the car is 0.001, which is lesser than 0.3. Thus, the training data generating apparatus changes the probability that the object is the car to a negative value indicating that the object does not matches the car.

The plurality of intervals into which the training data generating apparatus classifies the label values based on the threshold label values may include an interval inappropriate for training the student model 550. In the example of FIG. 5, the label value greater than or equal to 0.3 and less than or equal to 0.8 ambiguously indicates that the object matches a class corresponding to the label value and that the object does not match the class corresponding to the label value. Thus, the training data generating apparatus changes a label value included in the interval to be inappropriate for training the student model 550 such that an identifier of the interval indicating that the label value is not to be used for training of the student model 550. The probability that the object of the input data 510 is the cyclist is 0.31, which is between 0.3 and 0.8. Thus, the training data generating apparatus changes the probability that the object is the cyclist to an ignore value indicating it is not to be use for training the student model 550.

Each of the label values output from the teacher model ensemble 520 is changed to one of the positive value, the negative value, and the ignore value. The training data generating apparatus visually outputs the changed label values to input data 540. The training data generating apparatus generates training data by combining the changed label values with the input data 510. The generated training data is used for training the student model 550.

The student model 550 outputs the label values including probabilities that the position of the object and the type of the object in the input data 510 match a preset class. In this example, the training data generating apparatus trains the student model 550 such that the output label values converge to the changed label values included in the training data. The training data generating apparatus trains the student model 550 such that the position of the object detected in the input data 510 by the student model 550 converges to a position of an object detected by the teacher model ensemble 520 as indicated by, for example, a bounding box in the input data 540.

The training data generating apparatus trains the student model 550 by comparing a probability that the object in the input data 510 matches a preset class, as a probability value output by the student model 550, to the label values represented as the positive value, the negative value, and the ignore value. In one example, the student model 550 determines the probability that the object is the pedestrian based on the input data 510 to be a relatively small value. In this example, a label value corresponding to the pedestrian included in the training data may be a positive value. In this instance, the training data generating apparatus trains the student model 550 to determine the probability that the object is the pedestrian to be a greater value. In another example, the student model 550 determines the probability that the object is the car based on the input data 510 to be a relatively great value. In this example, a label value corresponding to the car included in the training data may be the negative value. In this instance, the training data generating apparatus trains the student model 550 to determine the probability that the object is the car to be a smaller value.

Further, when the label value corresponding to the car included in the training data is the ignore value, the training data generating apparatus may not use the probability that the object is the cyclist output by the student model 550 to train the student model 550. Although a label value corresponding to the ignore value is not used for training the student model 550, the training data generating apparatus may generate a large amount of training data at a faster rate in comparison to a case in which a person extracts information from input data and generates training data. Thus, the student model 550 is more accurately trained based on a large number of label values corresponding to the positive value or the negative value.

Figure 6:
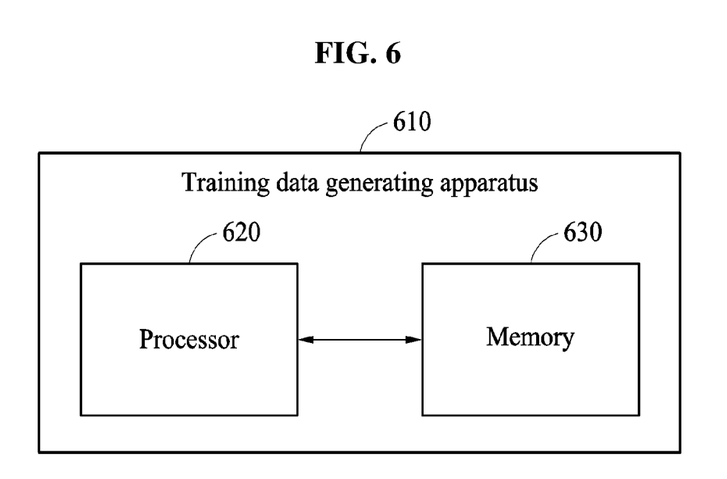
FIG. 6 illustrates an example of a training data generating apparatus.

FIG. 6 illustrates an example of a training data generating apparatus 610.

Referring to FIG. 6, the training data generating apparatus 610 includes a processor 620 and a memory 630. The training data generating apparatus 610 is, for example, an apparatus for training a neural network for data recognition or generating training data to train the neural network. The training data generating apparatus 610 may be implemented using at least one processor 620.

The processor 620 inputs input data stored in the memory 630 to at least one teacher model and acquires a probability label including a probability that the input data determined based on the at least one teacher model matches each of a plurality of classes. The processor 620 compares probabilities included in the probability label to a plurality of threshold probabilities and changes the probabilities to result values based on the comparing of the probabilities to the plurality of threshold probabilities.

The result value may be a value indicating that a probability is greater than a greatest threshold probability among the plurality of threshold probabilities, and include a positive value indicating that the input data matches a class corresponding to the probability. The result value may be a value indicating that a probability is less than a smallest threshold probability among the plurality of threshold probabilities, and include a negative value indicating that the input data does not match a class corresponding to the probability. Also, the result value may be a value indicating that a probability is greater than or equal to the smallest threshold probability and less than the greatest threshold probability, and include an ignore value indicating that the input data is not to be used for training a student model corresponding to the teacher model. The positive value, the negative value, and the ignore value correspond to probability intervals divided based on the plurality of threshold probabilities.

The processor 620 generates training data to be input to the student model by combining the input data and the results corresponding to the changed probability labels. The processor 620 stores the training data in the memory 630. When the training data generating apparatus 610 trains the student model, the student model is stored in the memory 630 and the processor 620 trains the student model based on the training data. In an example, the student model includes fewer hidden layers in comparison to the teacher model, or includes fewer filters or nodes in comparison to the teacher model. Through a model compression, the student model includes a neural network lighter than that of the teacher model. A compressed student model may be provided in an advanced driver assistance system (ADAS) as a form of ship and provided in an autonomous vehicle as a form of recognizer.

Figure 7:
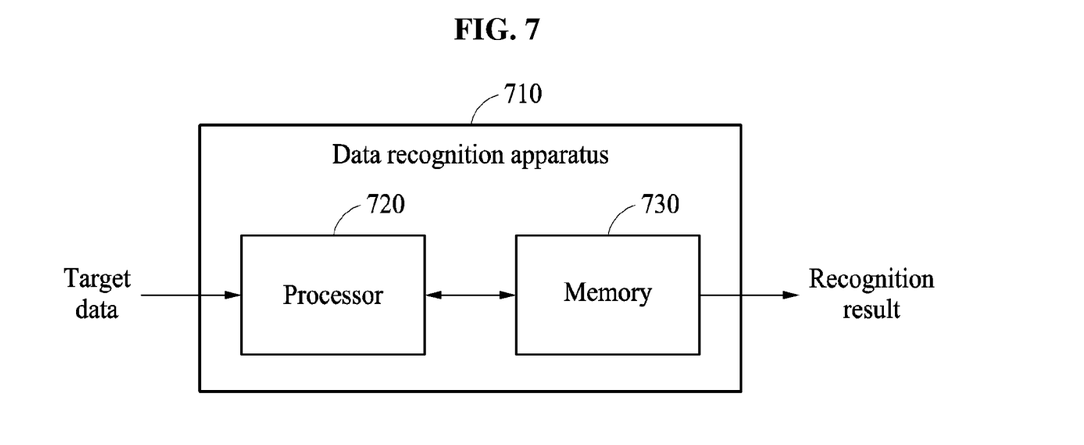
FIG. 7 illustrates an example of a data recognizing apparatus.

FIG. 7 is a diagram illustrating a structure of a data recognition apparatus 710.

Referring to FIG. 7, the data recognition apparatus 710 includes a processor 720 and a memory 730. The memory 730 is configured to store target data to be recognized. The processor 720 is configured to recognize the target data using a trained neural network, for example, a student model. The student model is trained based on training data generated based on a result obtained by classifying a label value as one of a plurality of intervals divided by the plurality of threshold probabilities. In this example, the label value is acquired by inputting input data to a teacher model corresponding to the student model. The student mode is trained based on a loss of results obtained by refining output data of the teacher model and output data of the student model corresponding to the input data. The results may correspond to the label values changed based on the operation in the example of FIG. 2.

The training data generating apparatus detects data inappropriate for training the student model from output data output by the trained teacher model based on the input data. The training data generating apparatus changes output data inappropriate for training the student model, to an ignore value such that the inappropriate output data is not to be used for training the student model. In terms of the output data appropriate for training the student model, the training data generating apparatus changes the output data such that the student model outputs an improved result in comparison to output data of the teacher model additionally to apply the output data to the training of the student model directly.

The training data generating apparatus 610, the data recognition apparatus 710, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating training data, the method comprising:
    inputting input data to a teacher model and acquiring from the teacher model a label value of the input data, the label value comprising a probability of the input data predicted by the teacher model;
    classifying the label value into one of a plurality of intervals based on comparing the label value to one or more threshold probabilities, wherein the intervals comprise an interval less than a second threshold probability, an interval greater than or equal to the second threshold probability and less than a first threshold probability, and an interval greater than or equal to the first threshold probability, wherein the first threshold probability is greater than the second threshold probability; and
    generating training data for training a student model corresponding to the teacher model based on combining the input data and an identifier of the corresponding interval of the plurality of intervals.

2. The method of claim 1, wherein the classifying comprises classifying the label value into a positive interval among the intervals, based on the label value being greater than or equal to the first threshold probability, and the classification of the label value into the positive interval indicating that the input data belongs to a class associated with the label value.

3. The method of claim 1, wherein the classifying comprises classifying the label value into a negative interval among the intervals, based on the label value being less than the first threshold probability, and the classification of the label value into the negative interval indicating that the input data does not belong to a class associated with the label value.

4. The method of claim 1, wherein the one of the intervals comprises an ignore interval, and wherein the classifying comprises classifying the label value into the ignore interval, the classification into the ignore interval causing the label value to be not applied to a training of the student model when the combined input data is used to train the student model.

5. The method of claim 1, wherein a number of hidden layers in the student model is less than a number of hidden layers in the teacher model, or a number of filters in the student model is less than a number of filters in the teacher model.

6. The method of claim 1, wherein the plurality of intervals comprise one or more rational numbers indicating whether the input data corresponds to a class associated with the label value.

7. The data recognition method of claim 1, further comprising generating additional training data and repeating the training of the student model, in response to an accuracy of the student model being lesser than a threshold.

8. A non-transitory computer-readable storage medium storing instructions that, when executed by a processor, cause the processor to perform the user authentication method of claim 1.

9. A data recognition method comprising:
    receiving a target data item to be recognized; and
    recognizing the target data item using a student model that is trained,
    wherein the student model has been trained with training data generated by:
        predicting, by a teacher model corresponding to the student model, for the target data item, label values for respective classification labels for the target data item, each classification label having a respectively corresponding predicted label value,
        classifying the label values according to intervals by determining which of the intervals each label value is in, wherein the intervals comprise an interval less than a second threshold probability, an interval greater than or equal to the second threshold probability and less than a first threshold probability, and an interval greater than or equal to the first threshold probability.

10. The data recognition method of claim 9, wherein the intervals comprise a positive interval indicating that a classification label corresponds to a class associated with the label value, a negative interval indicating that a classification label does not correspond to the class associated with the label value, and an ignore interval indicating that the classification label is not applied to a training of the student model when the target data item is used to train the student model.

11. The data recognition method of claim 9, wherein the teacher model comprises a number of hidden layers less than a number of hidden layers in the student model or a number of filters less than a number of filters included in the student model.

12. A non-transitory computer-readable storage medium storing instructions that, when executed by a processor, cause the processor to perform the user authentication method of claim 9.

13. An apparatus for generating training data, the apparatus comprising:
   a memory configured to store a single input data item; and
   a processor configured to:
      input the single input data item to at least one teacher model to acquire probabilities that the input data item matches respective classes;
      compare the probabilities to threshold probabilities comprising a first threshold probability greater than a second threshold probability, and based thereon change the probabilities to respective values corresponding to results of the comparing; and
      generate a training data item for training a student model corresponding to the at least one teacher model by combining the input data item and the values.

14. The apparatus of claim 13, wherein the processor is further configured to change a probability, among the probabilities, to a positive value indicating that the input data item matches a class corresponding to the probability, based on the probability being greater than or equal to a threshold probability among the threshold probabilities.

15. The apparatus of claim 13, wherein the processor is further configured to change a probability, among the probabilities, to a negative value indicating that the input data does not match a class corresponding to the probability, in response to the probability being less than or equal to a threshold probability among the threshold probabilities.

16. The apparatus of claim 13, wherein the processor is further configured to change a probability, among the probabilities, to an ignore-value indicating that a feature of the data item corresponding to the probability is not applied to a training of the student model when the input data item is used to train the student model.

17. The apparatus of claim 13, wherein the at least one teacher model comprises a plurality of teacher models and the processor is further configured to acquire the probabilities based on the plurality of teacher models.

18. The apparatus of claim 16, wherein, the probability is changed to the ignore-value based on the probability being greater than a first of the probability thresholds and less than a second of the probability thresholds, wherein the first probability threshold is greater than zero and the second probability threshold is less than one.

* * * * *